(12) United States Patent
Tanaka et al.

(10) Patent No.: US 6,510,136 B1
(45) Date of Patent: Jan. 21, 2003

(54) METHOD AND APPARATUS FOR SETTING A SIGNALING VIRTUAL CHANNEL FOR AN ATM EXCHANGE SYSTEM

(75) Inventors: Makoto Tanaka; Shoji Fuwa; Fumiyasu Tanaka; Hiroaki Yamazaki; Atsushi Niwa; Takashi Nakashima, all of Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/270,328

(22) Filed: Mar. 16, 1999

(30) Foreign Application Priority Data

Jun. 25, 1998 (JP) .......................... 10-178336

(51) Int. Cl.⁷ ............................................. G01R 31/08
(52) U.S. Cl. ................. 370/230; 370/397; 370/399; 370/409
(58) Field of Search ................. 370/236, 230, 370/395, 397, 399, 409, 410, 437

(56) References Cited

U.S. PATENT DOCUMENTS

| | | | |
|---|---|---|---|
| 5,235,599 A | * | 8/1993 | Nishimura et al. ............ 714/4 |
| 5,287,535 A | * | 2/1994 | Sakagawa et al. .......... 370/389 |
| 5,416,771 A | * | 5/1995 | Iwata ........................ 370/410 |
| 5,479,402 A | * | 12/1995 | Hata et al. .................. 370/397 |

FOREIGN PATENT DOCUMENTS

| | | |
|---|---|---|
| JP | 3-97334 | 4/1991 |
| JP | 3-234137 | 10/1991 |
| JP | 6-350636 | 12/1994 |

* cited by examiner

Primary Examiner—Wellington Chin
Assistant Examiner—William Schultz
(74) Attorney, Agent, or Firm—Katten Muchin Zavis Rosenman (57) ABSTRACT

A signaling virtual channel (SVC) is established only when it is necessary so that a bandwidth reserved for a signaling channel for transmitting signaling information is usable for transmitting communication information. The SVC is established between a subscriber terminal and an asynchronous transfer mode (ATM) exchange system by selecting the virtual path identifier (VPI) and the virtual channel identifier (VCI) for signaling only when a request for a call connection is made by the subscriber terminal or only when a notification of reception of a call is sent to the subscriber terminal. A communication path between the subscriber terminal and the ATM exchange system is established for transmitting communication information by transmitting communication call setting information through the SVC. The SVC is released after an establishing operation of the communication path is completed.

10 Claims, 3 Drawing Sheets

METHOD AND APPARATUS FOR SETTING A SIGNALING VIRTUAL CHANNEL FOR AN ATM EXCHANGE SYSTEM

BACKGROUND OF THE INVENTION

1. Field of the Invention

The present invention generally relates to an ATM exchange system and, more particularly, to a method and apparatus for setting a signaling virtual channel used for signal transmission in an ATM exchange system.

2. Description of the Related Art

A conventional asynchronous transfer mode (ATM) exchange system establishes or cancels a communication channel for transferring communication information received from a subscriber terminal in accordance with signaling information which is provided to setup a call. The ATM exchange receives the signal information from the subscriber terminal through a signaling virtual channel (SVC). The signaling virtual channel (SVC) is fixedly established so that the signaling information can be transmitted any time.

In the conventional ATM exchange system, a virtual path identifier (VPI) and a virtual channel identifier (VCI) are registered for setting the signaling virtual channel (SVC). The virtual path identifier (VPI) and a virtual channel identifier (VCI) are assigned to each subscriber terminal so that the signaling virtual channel (SVC) can be established by assigning a transmission bandwidth for transmitting the signaling information to each pair of the virtual path identifier (VPI) and the virtual channel identifier (VCI).

Accordingly, the signaling virtual channel (SVC) is continuously established on the communication path irrespective of presence of a communication call so that a subscriber can send a call setup request (a request for establishing a communication path for transferring communication information) or a call disconnect request (a request for disconnecting the communication path) through the signaling virtual channel (SVC).

Accordingly, the signaling virtual channel (SVC) is maintained even after the communication channel is established in which condition the signal virtual channel (SVC) is not needed. That is, the bandwidth used for the signaling virtual channel (SVC) is continuously reserved despite that the signaling virtual channel (SVC) is not necessary after the establishment of the communication channel is completed. Accordingly, the bandwidth assigned to the signaling virtual channel (SVC) cannot be assigned to the communication channel for transmitting communication information. Thus, the entire bandwidth allocated to the communication path of the ATM exchange system cannot be effectively used for the communication channel which is established for transmitting the communication information other than the signaling information.

Additionally, since the signaling virtual channel (SVC) must be identified by a previously registered virtual path identifier (VPI) and a virtual channel identifier (VCI), a subscriber terminal must send a call setup request upon recognition of the virtual path identifier (VPI) and the virtual channel identifier (VCI) provided in the ATM exchange system to which the subscriber terminal is to be connected.

Accordingly, a subscriber using a portable communication terminal must transmit the signaling information by using different signaling virtual path identifier (VPI) and the virtual channel identifier (VCI) for each ATM exchange system. Thus, a call setup request procedure is complicated and inconvenient.

SUMMARY OF THE INVENTION

It is a general object of the present invention to provide an improved and useful method and apparatus for establishing a signaling virtual channel for an ATM exchange system in which the above-mentioned problems are eliminated.

A more specific object of the present invention is to provide a method and apparatus for establishing a signaling virtual channel for an ATM exchange system to establish a signaling virtual channel (SVC) only when it is necessary so that a bandwidth conventionally reserved for a signaling channel for transmitting signaling information is used for transmitting communication information.

Another object of the present invention is to provide a method and apparatus for establishing a signaling virtual channel for an ATM exchange system which method and apparatus permit a subscriber terminal which is for a different ATM exchange system enabling signaling information to be transmitted or received without recognizing specific values of the signaling virtual path identifier (VPI) and the virtual channel identifier (VCI) registered for each ATM exchange system.

In order to achieve the above mentioned objects, there is provided according to one aspect of the present invention a method for setting a signaling virtual channel (SVC) between a subscriber terminal and an asynchronous transfer mode (ATM) exchange system, the signaling virtual channel (SVC) being identified by a virtual path identifier (VPI) and a virtual channel identifier (VCI) for signaling, the method comprising the steps of:

establishing the signaling virtual channel (SVC) between the subscriber terminal and the asynchronous transfer mode exchange system by selecting the virtual path identifier (VPI) and the virtual channel identifier (VCI) for signaling only when a request for a call connection is made by the subscriber terminal or only when a notification of reception of a call is sent to the subscriber terminal;

establishing a communication path between the subscriber terminal and the asynchronous transfer mode exchange system for transmitting communication information by transmitting communication call setting information through the signaling virtual channel (SVC); and releasing the signaling virtual channel (SVC) after an establishing operation of the communication path is completed.

According to the above-mentioned invention, the signaling virtual channel (SVC) is established only when a request for connecting a call is made. After the communication path is established by using the communication call setting information transmitted through the signaling virtual channel (SVC), the signaling virtual channel is released since there is no need to maintain the signaling virtual channel (SVC). Accordingly, a bandwidth used for establishing the signaling virtual channel can be used for establishing a communication path for transmitting communication information. Thus, the entire bandwidth can be effectively used for establishing the communication path.

In method according to this invention, the step of establishing the signaling virtual channel may include:

selecting a virtual path identifier (VPI) and a virtual channel identifier (VCI) for signaling which are assumed to be usable for both the subscriber terminal and the asynchronous transfer mode (ATM) exchange system;

selecting a different virtual path identifier (VPI) and a different virtual channel identifier (VCI) for signaling when the selected virtual path identifier (VPI) and virtual channel identifier (VCI) are unusable for at least one of the subscriber terminal and the asynchronous transfer mode exchange system; and repeating the step of selecting a virtual path identifier (VPI) and a virtual channel identifier (VCI) and the step of selecting a different virtual path identifier (VPI) and a different virtual channel identifier (VCI) until virtual path identifier (VPI) and the different virtual channel identifier (VCI) usable for both the subscriber terminal and the asynchronous transfer mode (ATM) exchange system are selected.

In this invention, selection of the virtual path identifier (VPI) and the virtual channel identifier (VCI) are repeated until the virtual path identifier (VPI) and the virtual channel identifier (VCI) usable for both the subscriber terminal and the asynchronous transfer mode exchange system are finally selected. Thus, a possibility of failure of establishing the signaling virtual channel (SVC) which results in a discommunicable state is reduced.

The method according to the present invention may further comprise the step of disconnecting the communication path when a predetermined communication period has been elapsed after the signaling virtual channel (SVC) is released.

According to this invention, the communication path can be disconnected without following a normal signaling procedure using the signaling virtual channel (SVC) by monitoring the predetermined communication period. Thereby, the signaling virtual channel (SVC) can be released when communication is being performed through the communication path. Thus, a bandwidth assigned to the signaling virtual channel (SVC) can be effectively used for the communication path.

Additionally, the method according to the present invention may further comprise the step of disconnecting the communication path when a communication requesting period has been elapsed after the signaling virtual channel (SVC) is released, information regarding the communication requesting period being included in the communication call setting information.

According to this invention, the communication path can be disconnected without following a normal signaling procedure using the signaling virtual channel (SVC) by monitoring the requested communication period. Thereby, the signaling virtual channel (SVC) can be released when communication is being performed through the communication path. Thus, a bandwidth assigned to the signaling virtual channel (SVC) can be effectively used for the communication path.

Further, the method according to the present invention may further comprise the step of disconnecting the communication path when a communication failure is detected in the asynchronous transfer mode (ATM) exchange system.

According to this invention, the communication path can be disconnected without following a normal signaling procedure using the signaling virtual channel (SVC) by monitoring a failure occurring in the asynchronous transfer mode exchange system. Thereby, the signaling virtual channel (SVC) can be released when communication is being performed through the communication path. Thus, a bandwidth assigned to the signaling virtual channel (SVC) can be effectively used for the communication path.

Additionally, there is provided according to another aspect of the present invention an apparatus for setting a signaling virtual channel (SVC) between a subscriber terminal and an asynchronous transfer mode (ATM) exchange system, the signaling virtual channel (SVC) being identified by a virtual path identifier (VPI) and a virtual channel identifier (VCI) for signaling, a communication path being established between the subscriber terminal and the asynchronous transfer mode (ATM) exchange system by exchanging communication call setting information through the signaling virtual channel (SVC), the apparatus comprising:

a signal management unit receiving a signal transmitted from the subscriber terminal when a request for connecting a call is made by the subscriber terminal, the signal including the virtual path identifier (VPI) and the virtual channel identifier (VCI) for signaling;

a bandwidth management unit determining whether or not the virtual path identifier (VPI) and the virtual channel identifier (VCI) included in the signal received by the signal management unit are usable for signaling so as to acquire the signaling virtual channel (SVC) when the virtual path identifier (VPI) and the virtual channel identifier (VCI) are usable for signaling; and a signaling virtual channel (SVC) protocol control unit selecting the virtual path identifier (VPI) and the virtual channel identifier (VCI) for signaling, when a notification of reception of a call is sent to the subscriber terminal, so as to inquire the bandwidth management unit whether or not the selected virtual path identifier (VPI) and the selected virtual channel identifier (VCI) are usable for signaling so that an instruction to transmit the selected virtual path identifier (VPI) and the selected virtual channel identifier (VCI) is sent to the subscriber terminal receiving a call, the signaling virtual channel (SVC) protocol control unit instructing a disconnection of the signaling virtual channel (SVC) after a setting operation of the communication path to the subscriber terminal is completed.

Additionally, the apparatus according to the present invention, the signaling virtual channel (SVC) protocol control unit may select a virtual path identifier (VPI) and a virtual channel identifier (VCI) for signaling which are assumed to be usable for both the subscriber terminal and the asynchronous transfer mode (ATM) exchange system when a notification of reception of a call is sent to the subscriber terminal;

the signaling virtual channel (SVC) protocol control unit may also select a different virtual path identifier (VPI) and a different virtual channel identifier (VCI) for signaling when the selected virtual path identifier (VPI) and virtual channel identifier (VCI) are unusable for at least one of the subscriber terminal and the asynchronous transfer mode exchange system; and the signaling virtual channel (SVC) protocol control unit may repeat the selection of a virtual path identifier (VPI) and a virtual channel identifier (VCI) and the selection of a different virtual path identifier (VPI) and a different virtual channel identifier (VCI) until virtual path identifier (VPI) and the different virtual channel identifier (VCI) usable for both the subscriber terminal and the asynchronous transfer mode (ATM) exchange system are selected.

Further, in the apparatus according to the present invention, the signaling virtual channel (SVC) protocol control unit may send an instruction to disconnect the communication path when a predetermined communication period has been elapsed after the signaling virtual channel (SVC) is released.

Alternatively, the signaling virtual channel protocol (SVC) control unit may send an instruction to disconnect the communication path when a communication requesting period has been elapsed after the signaling virtual channel (SVC) is released, information regarding the communication requesting period being included in the communication call setting information.

Further, the signaling virtual channel (SVC) protocol control unit may send an instruction to disconnect the communication path when a communication failure is detected in the asynchronous transfer mode (ATM) exchange system.

Other objects, features and advantages of the present invention will become more apparent from the following detailed description when read in conjunction with the following detailed information.

DETAILED DESCRIPTION OF THE PREFERRED EMBODIMENTS

Figure 1:
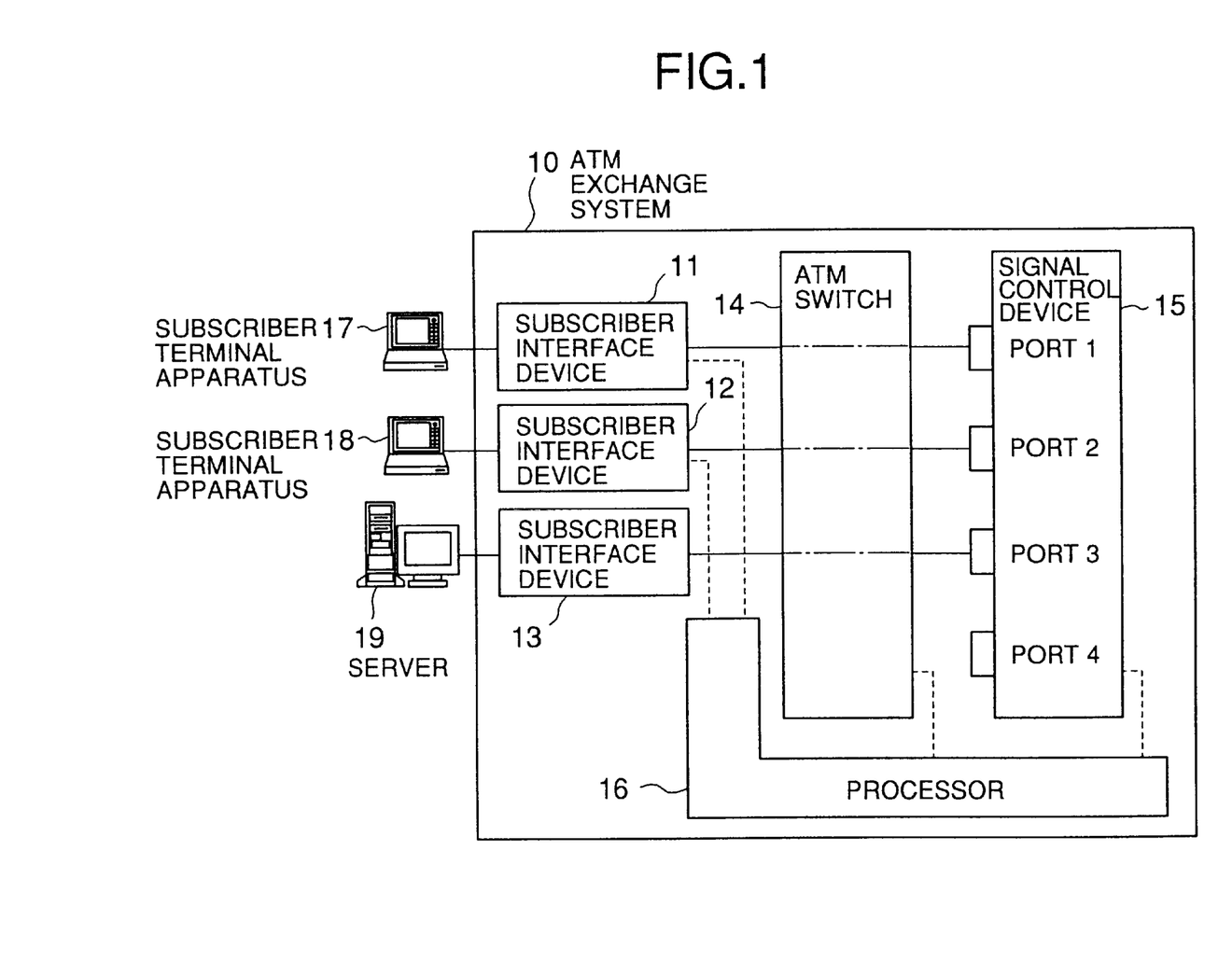
FIG. 1 is a system diagram of an ATM exchange system using a method for setting a signaling virtual channel according to a first embodiment of the present invention.

A description will now be given, with reference to FIG. 1, of a first embodiment of the present invention. FIG. 1 is a system diagram of an ATM exchange system using a method for setting a signaling virtual channel according to the first embodiment of the present invention.

In FIG. 1, the ATM exchange system 10 comprises subscriber interface devices 11, 12 and 13, an ATM switch 14, a signal control device 15 and a processor 16. The subscriber interface devices 11 and 12 are connected to subscriber terminals 17 and 18, respectively. The subscriber interface device 19 is connected to a server 19 such as a video server. Hereinafter, each of the subscriber terminal apparatuses 17 and 18 and the server 19 may be referred to as a subscriber terminal.

It should be noted that signal lines indicated by solid lines in the figure represent paths through which ATM cells are transferred. Additionally, signal lines indicated by single dashed line represent communication paths established by the ATM switch 14. Further, signal lines indicated by dashed lines represent paths through which control information is exchanged between the devices provided in the ATM exchange system 10.

Each of the subscriber interface devices 11 to 13 serves to bidirectionally transmit cells between the ATM switch 14 and respective one of the subscriber terminals 17 to 19. That is, each of the subscriber interface devices 11 to 13 transmits user cells to the ATM switch 14, and converts cells input from the ATM switch 14 into the user cells and transmits the converted user cells to the respective one of the subscriber terminals 17 to 19.

The ATM switch 14 checks transmission route information (VPI, VCI) with respect to cells input thereto. The ATM switch 14 establishes a communication path so as to transfer the cells to an apparatus which has an ATM switch interface in accordance with the transmission route information (VPI, VCI).

The signal control device 15 has a function similar to the ATM switch interface function of each of the subscriber interface devices 11 to 13. The signal control device 15 receives a control signal cell, which is transmitted through a signaling virtual channel (SVC), from the subscriber terminals 17 to 19 via the ATM switch 14 and respective ports 1 to 3 thereof. The signal control device 15 discriminates a call setup control signal from the received control signal cell, and sends information regarding the contents of the call setup control signal to the processor 16.

Additionally, the signal control device 15 accepts various signaling information sending requests output from the processor 16. The signal control device 15 sends a control signal cell which includes signaling information from a port designated by the processor 16 to the corresponding one of the subscriber terminals 17 to 19 via the ATM switch 14. The control signal cell is transmitted through the signaling virtual channel (SVC).

Figure 2:
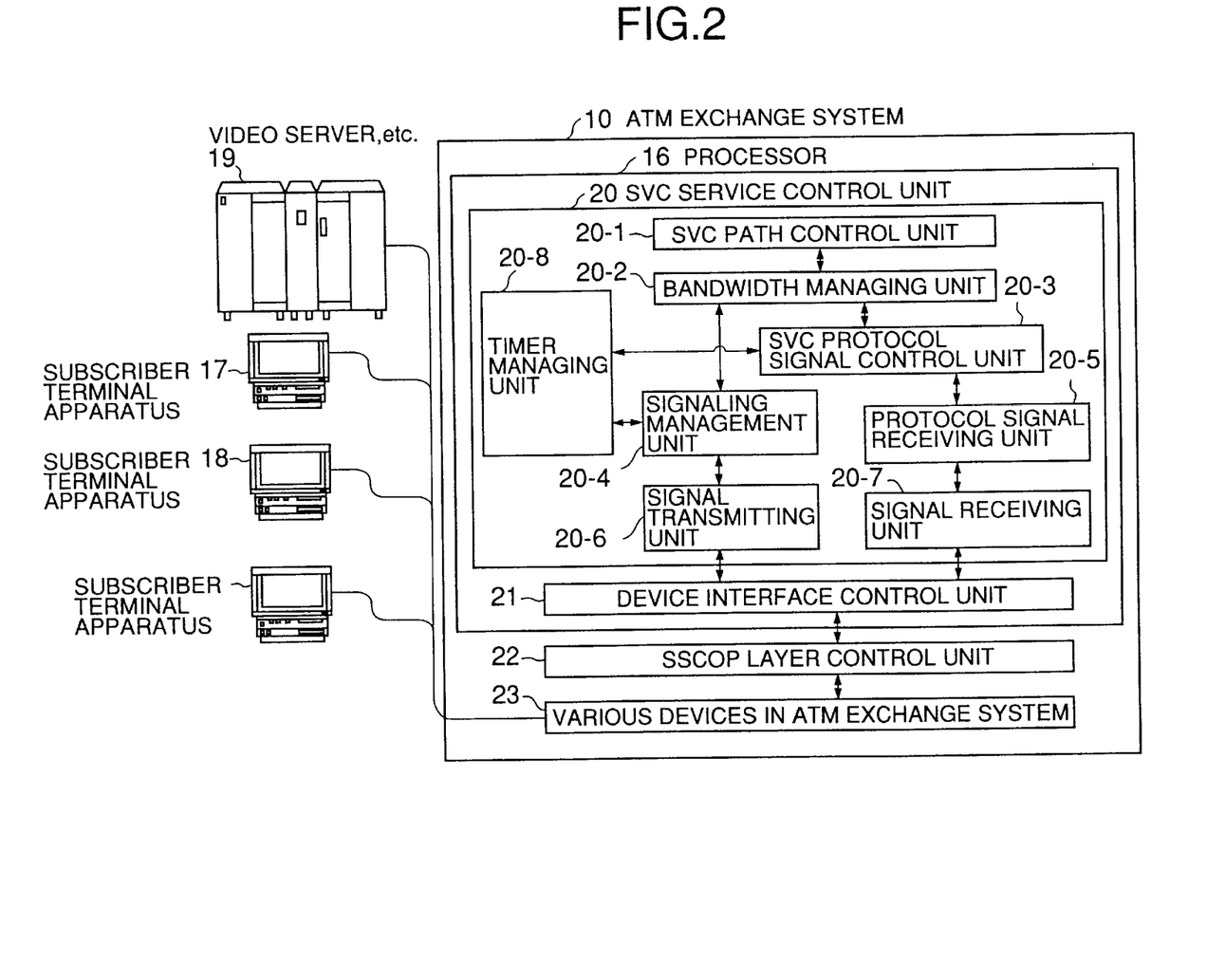
FIG. 2 is a block diagram of a processor of the ATM exchange system shown in FIG. 1.

FIG. 2 is a block diagram of the processor 16 provided in the ATM exchange system 10. In FIG. 2, parts that are the same as the parts shown in FIG. 1 are given the same reference numerals, and descriptions thereof will be omitted. As shown in FIG. 2, the ATM exchange system 10 includes a signaling virtual channel (SVC) service control unit 20, a device interface control unit 21, an SSCOP layer control unit 22 and various devices 23 provided in the ATM exchange system 10.

In FIG. 2, the block indicated as the various devices 23 represents functional units provided in a lower order layer (physical layer) with respect to various devices including the subscriber terminals 17 to 19, the ATM switch 14 and the signal control device. The SSCOP layer control unit 22 is firmware, which has functions of software and hardware, provided in the signal control device 15. The SSCOP layer control unit 22 serves to transfer the signaling information to the device interface control unit 21 of the processor 16 in accordance with a service specific connection oriented protocol (SSCOP).

The service specific connection oriented protocol (SSCOP) was developed for the replacement of a conventional LAPD protocol, and is a protocol for a signal ATM adaptation layer developed for a broad ISDN. The service specific connection oriented protocol (SSCOP) is commonly used by a user-network interface and an inter-exchange-terminal interface.

The processor 16 includes the signaling virtual channel (SVC) service control unit 20 and the device interface unit 21. The signaling virtual channel (SVC) control unit 20 comprises a signaling virtual channel (SVC) path control unit 20-1, bandwidth managing unit 20-2, a signaling virtual channel (SVC) protocol control unit 20-3, a signaling management unit 20-4, a protocol signal receiving unit 20-5, a signal transmitting unit 20-6, a signal receiving unit 20-7 and a timer management unit 20-8. It should be noted that the functions of the processor 16 shown in FIG. 2 include functional units in an upper order layer achieved by a processor in the signal control device 15 shown in FIG. 1.

Figure 3:
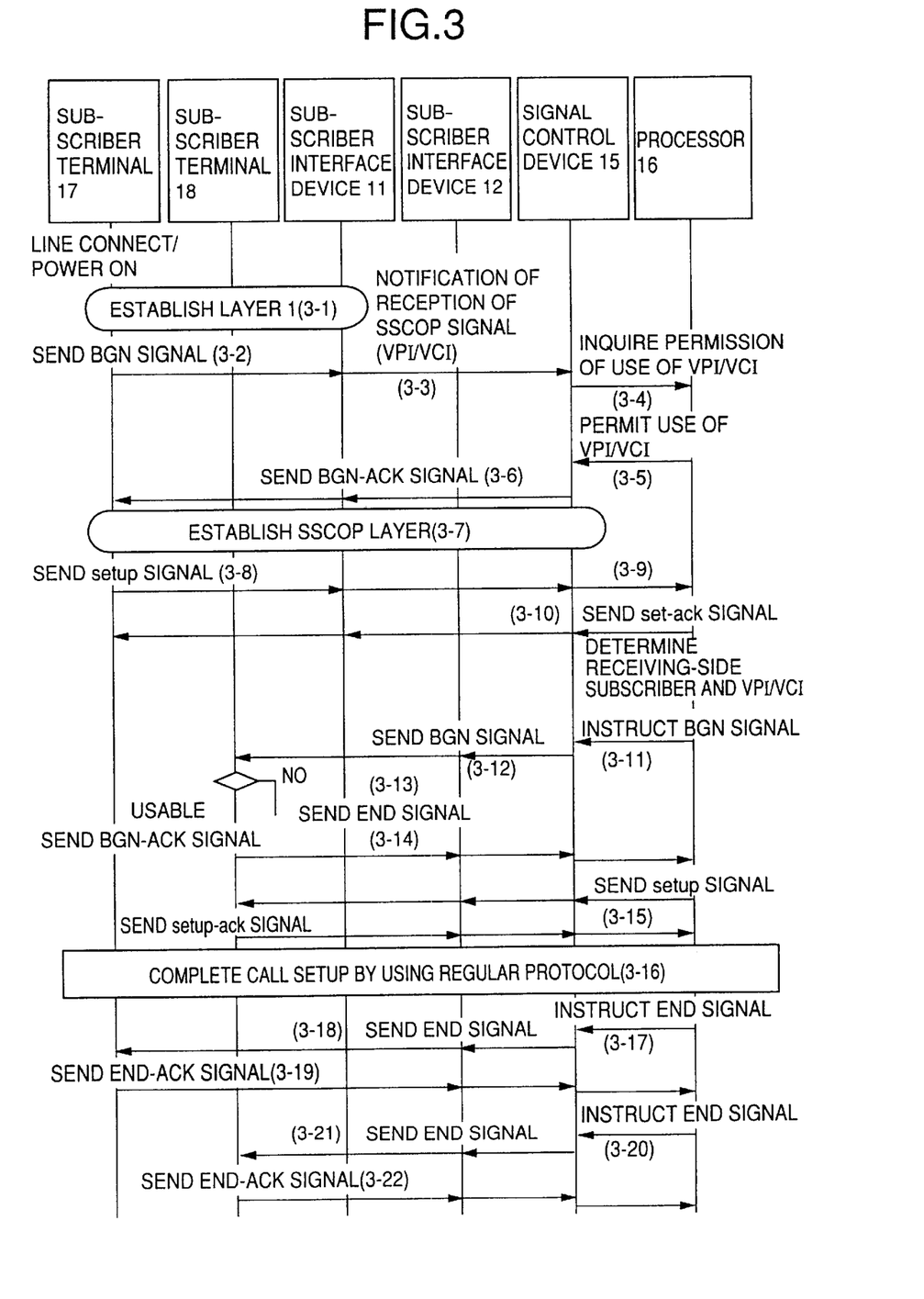
FIG. 3 is a sequence chart for explaining a sequence for setting and canceling the signaling virtual channel.

FIG. 3 is a sequence chart for explaining a sequence for setting and canceling the signaling virtual channel (SVC). FIG. 3 shows a sequence for sending and receiving a signal among the subscriber terminal, the subscriber interface device, the signal control device and the processor. Additionally, FIG. 3 also shows a sequence for setting and canceling the signaling virtual channel (SVC) and a communication path. A description will now be given, with reference to FIGS. 2 and 3, of an operation for setting and canceling the signaling virtual channel (SVC) according to the present invention.

When the subscriber terminal 17 is turned on, a layer 1 (physical layer) connection is established, in step 3-1, between the subscriber terminal 17 and the corresponding subscriber interface device 11 of the ATM exchange system 10.

Thereafter, the subscriber terminal 17 arbitrarily selects a virtual path identifier (VPI) and a virtual channel identifier (VCI) that are to be used by the subscriber terminal 17. In step S3-2, the subscriber terminal 17 sets the selected virtual path identifier (VPI) and virtual channel identifier (VCI) in a header of a cell and sends a BGN (begin) signal of an SSCOP message to the subscriber interface device 11 so as to request establishment of the signaling virtual channel (SVC).

Upon receipt of the BGN signal, in step 33, the subscriber interface device 11 of the ATM exchange system 10 sends to the SSCOP layer control unit 22 of the signal control device 15 a notification indicating that the SSCOP message was received. At the same time, the subscriber interface device 11 extract the virtual path identifier (VPI) and the virtual channel identifier (VCI) provided in the header of the received cell, and sends to the SSCOP layer control unit 22 a notification indicating that the virtual path identifier (VPI) and the virtual channel identifier (VCI) were received.

The notification of the reception of the BGN signal is sent from the SSCOP layer control unit 22 to the device interface control unit 21 of the processor 16, and is sequentially sent from the device interface control unit 21 to the signaling management unit 20-4 via the signal transmitting unit 20-6. At this time, the virtual path identifier (VPI) and the virtual channel identifier (VCI) are also sent from the device interface control unit 21 to the signaling management unit 20-4.

Thereafter, in step 3-4, the signaling management unit 20-4 sends inquiry to the bandwidth management unit 20-2 as to whether or not the received virtual path identifier (VPI) and virtual channel identifier (VCI) are usable as signaling information in the present ATM exchange system 10.

If the received virtual path identifier (VPI) and virtual channel identifier (VCI) are usable, the bandwidth management unit 20-2 acquires a transmission bandwidth for signaling by using a previously registered value or a default value, and sends a notification, in step 3-5, to the signaling management unit 20-4 that the virtual path identifier (VPI) and the virtual channel identifier (VCI) are usable as signaling information.

Upon receipt of the notification from the bandwidth management unit 20-2, the signaling management unit 20-4 sends an instruction indicating a transmission of a BGN-ACK signal to the signal transmitting unit 20-6. Then, in step 3-6, the signal transmitting unit 20-6 sends the BGN-ACK signal to the subscriber terminal 17 via the interface control unit 21 and the SSCOP layer control unit 22.

In the above-mentioned manner, the SSCOP layer connection is established, in step 3-7, between the subscriber terminal 17 and the signal control device 15 and, thereby, the signaling virtual channel (SVC) is set. At this time, the signaling management unit 20-4 sends to the timer management unit 20-8 a request for setting a timer. The necessity of the timer setting request will be described later.

Thereafter, in step 3-8, the subscriber terminal 17 sends to the ATM exchange system 10 a setup signal including signaling information by a control signal cell provided with the virtual path identifier (VPI) and the virtual channel identifier (VCI) which were permitted for use.

The setup signal is received by the subscriber interface device 11 in the ATM exchange system 10, and is sent to the signal receiving unit 20-7, in step 3-9, via the SSCOP layer control unit 22 and the device interface control unit 21.

The signal receiving unit 20-7 analyzes and normalizes the received setup signal so as to facilitate a process by the signaling virtual channel (SVC) service control unit 20. The signal receiving unit 20-7 also sends a notification of reception of the setup signal to the signaling virtual channel (SVC) protocol control unit 20-3 via the protocol signal receiving unit 20-5.

Then, the signaling virtual channel (SVC) protocol determines the receiving-side subscriber in accordance with receiving-side subscriber information included in the received setup signal, and returns, in step 3-10, a setup-ark signal to the subscriber terminal 17 via the signal control device and the subscriber interface device.

On the assumption that the receiving-side subscriber information included in the above-mentioned setup signal is a reception request for the subscriber terminal 18, a setting operation of the signaling virtual channel (SVC) is performed with respect to the subscriber terminal 18.

The signaling virtual channel (SVC) protocol control unit 20-3 sends to the bandwidth management unit 20-2 a request for acquisition of a signaling bandwidth for the subscriber terminal 18 as a transmission bandwidth for transmitting the signaling information to the subscriber terminal 18 so as to acquire a signaling bandwidth for the subscriber terminal 18.

In the bandwidth management unit 20-2, when the signaling bandwidth is acquired and the virtual path identifier (VPI) and the virtual channel identifier (VCI) for the signaling are normally assigned, the bandwidth management unit 20-2 requests, in step 3-11, an establishment of an SSCOP layer to the signaling management unit 20-4. At this time, the protocol control unit 20-3 of the signaling virtual channel (SVC) protocol control unit 20-3 transfers to the signaling management unit 20-4 information regarding the acquired signaling bandwidth for the subscriber terminal and information regarding the virtual path identifier (VPI) and the virtual channel identifier (VCI) for signaling.

Then, in step 3-12, the signaling management unit 20-4 sends a BGN signal including the information regarding the virtual path identifier (VPI) and the virtual channel identifier (VCI) for signaling for the subscriber terminal 18 via the signal transmitting unit 20-6, the device interface control unit 21 and the SSCOP layer control unit 22.

The subscriber interface device 18 of the ATM exchange system 10 sends to the subscriber terminal 18 a control signal having a cell header provided with the above-mentioned virtual path identifier (VPI) and virtual channel identifier (VCI).

If the virtual path identifier (VPI) and the virtual channel identifier (VCI) are usable as the signaling information, the subscriber terminal 18 returns, in step 3-14, a BGN-ACK signal to the subscriber interface device 12. Thereby, the SSCOP layer is established, and the signaling virtual channel (SVC) is set for the subscriber terminal 18.

The signaling virtual channel (SVC) protocol control unit 20-3 sends, in step 3-15, a setup signal so as to transmit and receive a protocol signal for a receiving-side connection. Then, the signaling virtual channel (SVC) protocol control unit 20-3 detects a reception response of the subscriber terminal 18 in accordance with a signaling procedure. Thereafter, in step 3-16, a communication path is established between the subscriber terminal 17 and the subscriber terminal 18 in accordance with a regular protocol.

If a case occurs in which acquisition of a bandwidth is required, the signaling virtual channel (SVC) protocol control unit 20-3 acquires a necessary bandwidth for the bandwidth management unit 20-2. Then, the signaling virtual channel (SVC) path controlling unit 20-1 establishes a communication path between the subscriber terminal 17 and the subscriber terminal 18.

It should be noted that if it is determined, in step 3-14, that the virtual path identifier (VPI) and the virtual channel identifier (VCI) are not usable, an end signal is sent from the subscriber terminal 18. Upon receipt of the end signal, the signaling virtual channel (SVC) protocol control unit 20-3 sends a request for releasing the acquired bandwidth to the bandwidth management unit 20-2. Then, an attempt is made to acquire other virtual path identifier (VPI) and virtual channel identifier (VCI). If other virtual path identifier (VPI) and virtual channel identifier (VCI) can be acquired, a BGN signal is sent to the subscriber terminal 18 in the same manner as mentioned above.

The signaling virtual channel (SVC) protocol control unit 20-3 repeats such a process until establishing process of the signaling virtual channel (SVC) is completed. However, if the establishing process of the signaling virtual channel (SVC) is not completed until after a predetermined number of processes are repeated, the signaling virtual channel (SVC) protocol control unit 20-3 sends a RELEASE-COMP signal to the subscriber terminal.

After the signaling virtual channel (SVC) protocol control unit 20-3 confirms the establishment of the communication path between the subscriber terminal 17 and the subscriber terminal 18, the signaling virtual channel (SVC) protocol control unit 20-3 sends, in step 3-17, an instruction for sending an END signal to the signaling management unit 20-4 so as to disconnect the signaling virtual channel (SVC) to the subscriber terminal 17. Upon receipt of such an instruction, the signaling management unit 20-4 sends, in step 3-18, the END signal to the subscriber terminal 17 via the signal sending unit 20-6, the device interface control unit 21, the SSCOP layer control unit 22 and the subscriber interface device 11.

Upon receipt of the END signal, the subscriber terminal 17 sends, in step 3-19, an ENDACK signal to the signaling virtual channel (SVC) protocol control unit 20-3. Upon receipt of the END-ACK signal, the signaling virtual channel (SVC) protocol control unit 20-3 disconnects the signaling virtual channel (SVC) to the subscriber terminal 17.

Additionally, the signaling virtual channel (SVC) protocol control unit 20-3 sends, in step 3-20, an instruction for sending an END signal to the signaling management unit 20-4 so as to disconnect the signaling virtual channel (SVC) to the subscriber terminal 18. Upon receipt of such an instruction, the signaling management unit 20-4 sends, in step 3-21, the END signal to the subscriber terminal 18 via the signal sending unit 20-6, the device interface control unit 21, the SSCOP layer control unit 22 and the subscriber interface device 12.

Upon receipt of the END signal, the subscriber terminal 18 sends, in step 3-22, an END-ACK signal to the signaling virtual channel (SVC) protocol control unit 20-3. Upon receipt of the END-ACK signal, the signaling virtual channel (SVC) protocol control unit 20-3 disconnects the signaling virtual channel (SVC) to the subscriber terminal 18.

Thereafter, the signaling virtual channel (SVC) protocol control unit 20-3 selects a condition for disconnecting the established communication path from among the following conditions ① to ③ so as to send a request for disconnecting the communication path and releasing the transmission bandwidth being used to the bandwidth management unit 20-2 and the signaling virtual channel (SVC) path control unit 20-1.

① When a communication period previously set for each subscriber terminal has elapsed.

② When a communication request period is set in the setup signal, and the communication request period has elapsed.

③ When a communication failure is detected in the subscriber interface device or other devices which causes a state in which communication cannot be performed.

The communication period or the communication request period in the above-mentioned condition ① or ② is set by the signaling management unit 20-4 sending a timer setting request to the timer management unit 20-8. The communication path is forcibly disconnected after the communication period or the communication request period has elapsed.

According to the above-mentioned condition ③, a discommunicable state, such as a state in which a user of the communication terminal turns off a power after completion of communication, is detected by a layer 1 device such as the subscriber interface device so as to disconnect the established communication path.

As mentioned above, according to the present embodiment, the signaling management unit 20-4 is provided in the signaling virtual channels (SVC) service control unit 20 which is connected to the signaling virtual channel (SVC) protocol control unit 20-3 and the bandwidth management unit 20-2 so as to establish the signaling virtual channel (SVC) only when a call setup request is made. That is, the signaling virtual channel (SVC) is released when communication is not performed, and, thereby, the entire bandwidth usable for a communication path can be effectively used.

Additionally, according to the present embodiment, even a subscriber terminal using a different interface can make a call setup request to the ATM exchange system since the virtual path identifier (VPI) and the virtual channel identifier (VCI) to be used are determined upon inquiry being made between the subscriber terminal and the ATM exchange system as to whether the virtual path identifier (VPI) and the virtual channel identifier (VCI) are usable. Accordingly, the call setup request can be made without considering signaling virtual channel identifier (VCI) which is registered for each interface.

A description will now be given of specific values of a bandwidth which can be effectively used. If the communication path has a subscriber interface bandwidth of 160 Mbps and each subscriber terminal uses 1.5 Mbps for signaling, a bandwidth loss due to the bandwidth for signaling is about 0.94%. If the bandwidth for signaling can be used for communication and if the subscriber uses an N-ISDN (2B+D), about 10 additional subscribers (1500k/(16k+64×2)) can be connected.

Additionally, when dynamic image data is transmitted by MPEG2 using the above-mentioned interface bandwidth and if 1 Mbps is used for signaling, 26 subscribers (160 Mbps/(5 Mbps +1 Mbps)) can be connected in the conventional system whereas 32 subscribers (160 Mbps/5 Mbps) can be connected in the exchange system according to the present invention. The difference corresponds to 6 subscribers which results in an improvement of 23%.

As a specific application of the present invention, there is a POS communication system in which sales data of a chain store is transferred to a head quarter. Unlike a telephone service, such a communication system, does not require a real-time data transmission, and, for example, the sales data may be transmitted by next morning. Accordingly, if the signaling virtual channel (SVC) cannot be acquired when a call is made and an establishment of a communication call is failed, a transmission of the sale data may be performed a predetermined time after the failure by calling again after the predetermined time has been passed. Accordingly, a bandwidth for the signaling virtual channel (SVC) is not required to be always reserved for a call request.

It should be noted the ATM exchange system can accommodate both a subscriber terminal using an interface which establishes the signaling virtual channel according to the present invention and a subscriber terminal using an interface which establishes the signaling virtual channel according to the conventional method. One of the interfaces can be provided by setting and registering a service class of each subscriber terminal.

The present invention is not limited to the specifically disclosed embodiments, and variations and modifications may be made without departing from the scope of the present invention.

The present application is based on Japanese priority application No. 10-178336 filed on Jun. 25, 1998, the entire contents of which are hereby incorporated by reference.

What is claimed is:

1. A method for setting a signaling virtual channel (SVC) between a subscriber terminal and an asynchronous transfer mode (ATM) exchange system, the signaling virtual channel (SVC) being identified by a virtual path identifier (VPD and a virtual channel identifier (VCI) for signaling, the method comprising the steps of:

establishing the signaling virtual channel (SVC) between said subscriber terminal and said asynchronous transfer mode exchange system by selecting the virtual path identifier (VPI) and the virtual channel identifier (VCI) for signaling only when a request for a call connection is made by said subscriber terminal or only when a notification of reception of a call is sent to said subscriber terminal;

establishing a communication path between said subscriber terminal and said asynchronous transfer mode exchange system for transmitting communication information by transmitting communication call setting information through the signaling virtual channel (SVC); and releasing the signaling virtual channel (SVC) after an establishing operation of the communication path is completed, and assigning a bandwidth, which has been used for the signaling virtual channel, to a bandwidth for the communication path.

2. The method as claimed in claim 1, wherein the step of establishing the signaling virtual channel includes:

selecting a virtual path identifier (VPI) and a virtual channel identifier (VCI) for signaling which are assumed to be usable for both said subscriber terminal and said asynchronous transfer mode (ATM) exchange system;

selecting a different virtual path identifier (VPI) and a different virtual channel identifier (VCI) for signaling when the selected virtual path identifier (VPI) and virtual channel identifier (VCI) are unusable for at least one of said subscriber terminal and said asynchronous transfer mode exchange system; and repeating the step of selecting a virtual path identifier (VPI) and a virtual channel identifier (VCI) and the step of selecting a different virtual path identifier (VPI) and a different virtual channel identifier (VCI) until the different virtual path identifier (VPI) and the different virtual channel identifier (VCI) are usable for both said subscriber terminal and the asynchronous transfer mode (ATM) exchange system.

3. The method as claimed in claim 1, further comprising the step of:

disconnecting the communication path when a predetermined communication period has been elapsed after the signaling virtual channel (SVC) is released.

4. The method as claimed in claim 1, further comprising the step of:

disconnecting the communication path when a communication requesting period has been elapsed after the signaling virtual channel (SVC) is released, information regarding the communication requesting period being included in the communication call setting information.

5. The method as claimed in claim 1, further comprising the step of:

disconnecting the communication path when a communication failure is detected in said asynchronous transfer mode (ATM) exchange system.

6. An apparatus for setting a signaling virtual channel (SVC) between a subscriber terminal and an asynchronous transfer mode (ATM) exchange system, the signaling virtual channel (SVC) being identified by a virtual path identifier (VPI) and a virtual channel identifier (VCI) for signaling, a communication path being established between the subscriber terminal and said asynchronous transfer mode (ATM) exchange system by exchanging communication call setting information through the signaling virtual channel (SVC), said apparatus comprising:

a signal management unit receiving a signal transmitted from the subscriber terminal when a request for connecting a call is made by the subscriber terminal, the signal including the virtual path identifier (VPI) and the virtual channel identifier (VCI) for signaling;

a bandwidth management unit determining whether or not the virtual path identifier (VPI) and the virtual channel identifier (VCI) included in the signal received by said signal management unit are usable for signaling so as to acquire the signaling virtual channel (SVC) when the virtual path identifier (VPI) and the virtual channel identifier (VCI) are usable for signaling; and a signaling virtual channel (SVC) protocol control unit selecting the virtual path identifier (VPI) and the virtual channel identifier (VCI) for signaling, when a notification of reception of a call is sent to the subscriber terminal, so as to inquire said bandwidth management unit whether or not the selected virtual path identifier (VPI) and the selected virtual channel identifier (VCI) are usable for signaling so that an instruction to transmit the selected virtual path identifier (VPI) and the selected virtual channel identifier (VCI) is sent to said subscriber terminal receiving a call, said signaling virtual channel (SVC) protocol control unit instructing a disconnection of the signaling virtual channel (SVC) after a setting operation of the communication path to the subscriber terminal is completed.

7. The apparatus as claimed in claim 6, wherein said signaling virtual channel (SVC) protocol control unit selects a virtual path identifier (VPI) and a virtual channel identifier (VCI) for signaling which are assumed to be usable for both said subscriber terminal and said asynchronous transfer mode (ATM) exchange system when a notification of reception of a call is sent to the subscriber terminal;

said signaling virtual channel (SVC) protocol control unit also selects a different virtual path identifier (VPI) and a different virtual channel identifier (VCI) for signaling when the selected virtual path identifier (VPI) and virtual channel identifier (VCI) are unusable for at least one of said subscriber terminal and said asynchronous transfer mode exchange system; and said signaling virtual channel (SVC) protocol control unit repeats the selection of a virtual path identifier (VPI) and a virtual channel identifier (VCI) and the selection of a different virtual path identifier (VPI) and a different virtual channel identifier (VCI) until virtual path identifier (VPI) and the different virtual channel identifier (VCI) usable for both said subscriber terminal and the asynchronous transfer mode (ATM) exchange system are selected.

8. The apparatus as claimed in claim 6, wherein said signaling virtual channel (SVC) protocol control unit sends an instruction to disconnect the communication path when a predetermined communication period has been elapsed after the signaling virtual channel (SVC) is released.

9. The apparatus as claimed in claim 6, wherein said signaling virtual channel (SVC) protocol control unit sends an instruction to disconnect the communication path when a communication requesting period has been elapsed after the signaling virtual channel (SVC) is released, information regarding the communication requesting period being included in the communication call setting information.

10. The apparatus as claimed in claim 6, wherein said signaling virtual channel (SVC) protocol control unit sends an instruction to disconnect the communication path when a communication failure is detected in said asynchronous transfer mode (ATM) exchange system.

* * * * *